Jan. 7, 1958 J. B. KUCERA 2,818,929
THREE-WHEELED VEHICLE HAVING A HIGH ARCHED FRONT FRAME
Original Filed April 27, 1950 3 Sheets-Sheet 1

Inventor
JOSEPH B. KUCERA
By Hans G. Hoffmeister
Attorney

Jan. 7, 1958   J. B. KUCERA   2,818,929
THREE-WHEELED VEHICLE HAVING A HIGH ARCHED FRONT FRAME
Original Filed April 27, 1950   3 Sheets-Sheet 2
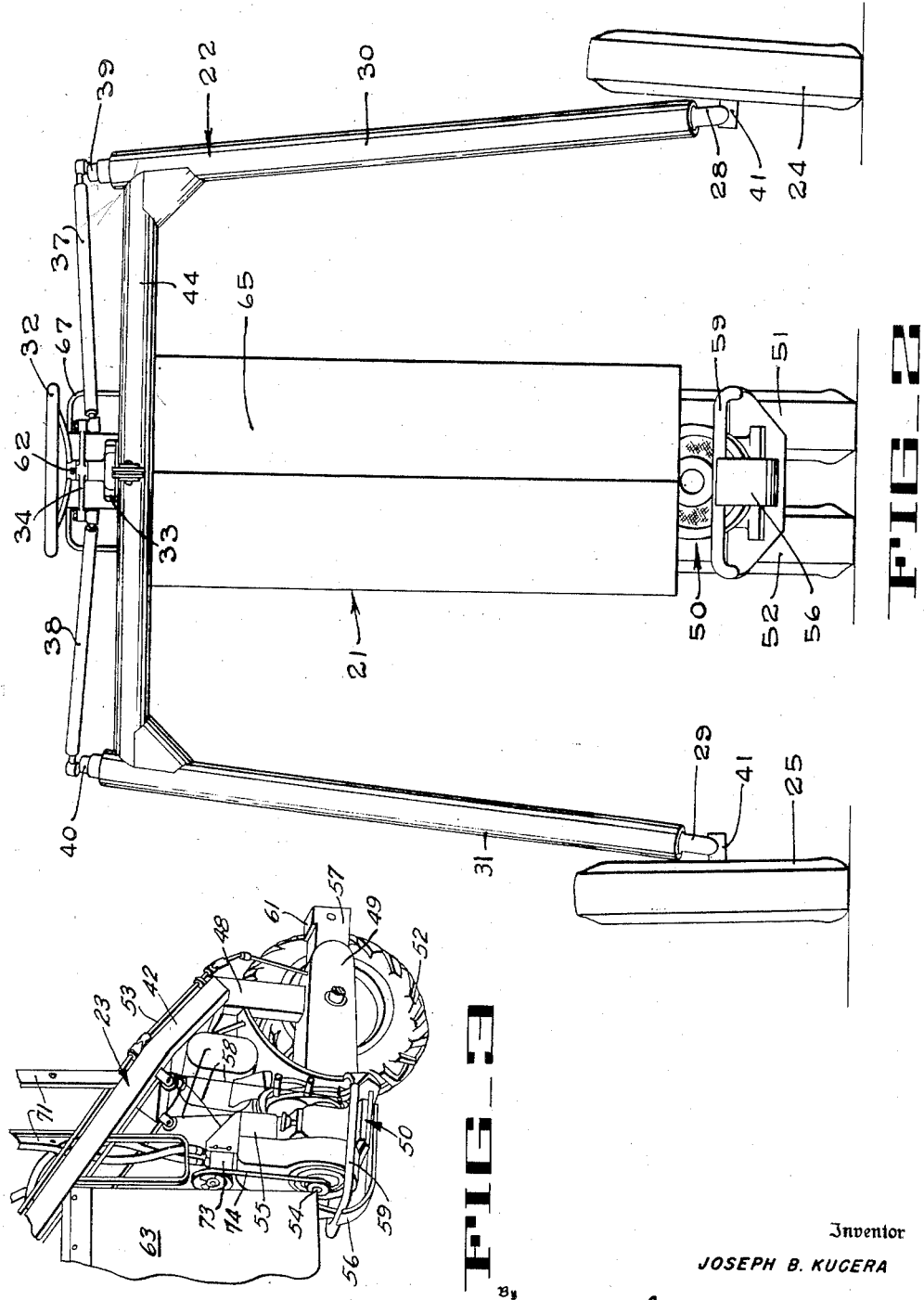
Inventor
JOSEPH B. KUCERA
By Hans G. Hoffmeister
Attorney Jan. 7, 1958 J. B. KUCERA 2,818,929
THREE-WHEELED VEHICLE HAVING A HIGH ARCHED FRONT FRAME
Original Filed April 27, 1950 3 Sheets-Sheet 3
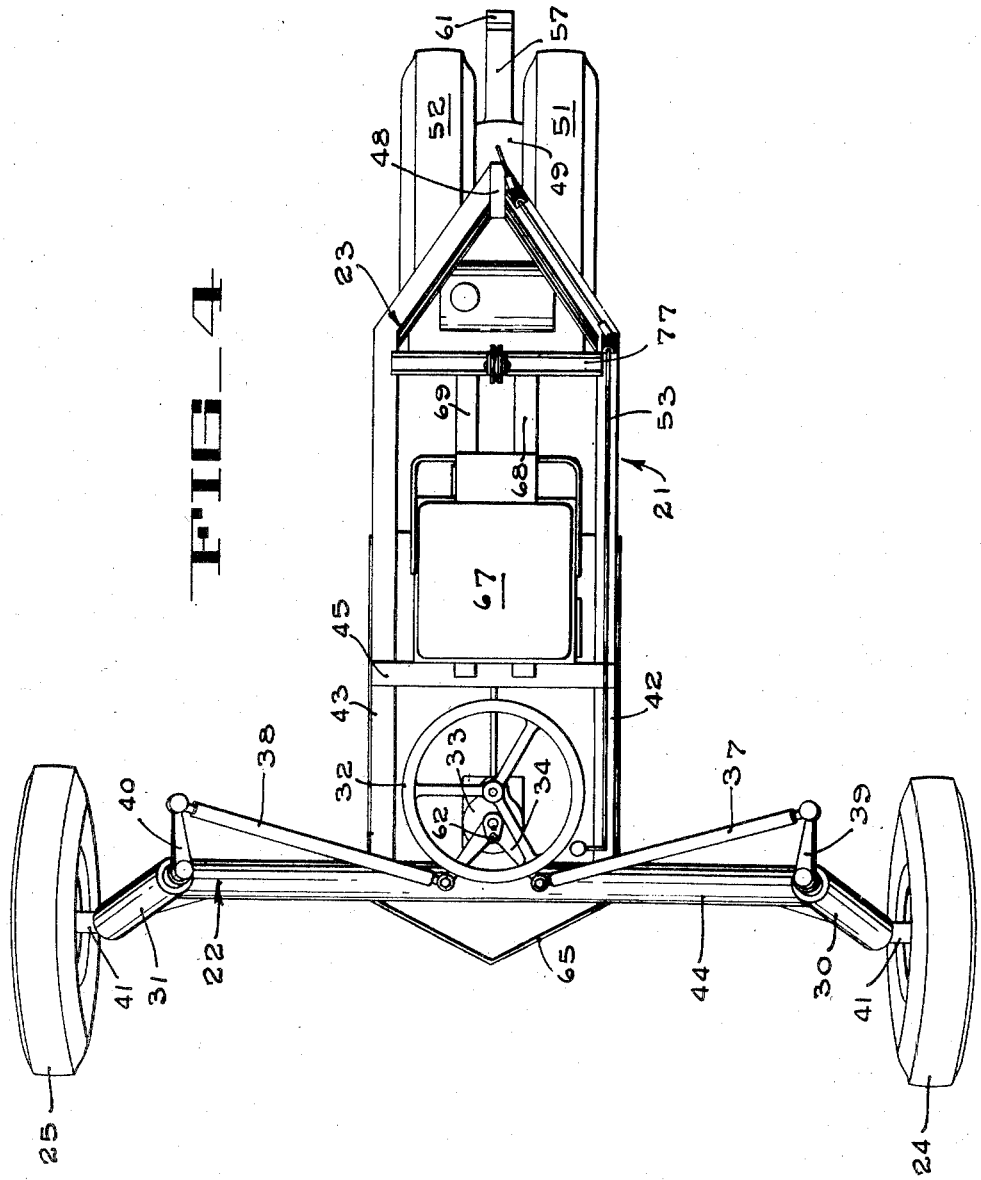
Inventor
JOSEPH B. KUCERA
By Hans G. Hoffmeister.
Attorney

United States Patent Office 2,818,929
Patented Jan. 7, 1958

2,818,929
THREE-WHEELED VEHICLE HAVING A HIGH ARCHED FRONT FRAME

Joseph B. Kucera, Traer, Iowa, assignor to Food Machinery and Chemical Corporation, San Jose, Calif., a corporation of Delaware Original application April 27, 1950, Serial No. 158,578, now Patent No. 2,657,093, dated October 27, 1953. Divided and this application February 24, 1953, Serial No. 338,419

12 Claims. (Cl. 180—25)

The present invention relates to vehicles and more particularly to vehicles of the high-clearance type.

This application is a division of my copending application Serial No. 158,578, filed April 27, 1950, for Plant Spraying Machine, which has issued as Patent No. 2,657,093 on October 27, 1953.

An object of the present invention is to provide a vehicle of the high-clearance type especially designed and adapted for agricultural purposes and general farm uses.

Another object is to provide a high-clearance type of vehicle having an extremely low center of gravity.

An additional object is to provide a self-propelled, high-clearance type of vehicle having great stability.

A further object is to provide a vehicle of the type referred to, which is easy and safe to operate.

A still further object is to provide a vehicle of the type referred to, which with the minimum expenditure of power, will operate effectively and efficiently either on hill sides and/or soft ground, and which will rapidly and readily extricate itself from chuck holes or the like when the same are encountered during vehicle operational periods.

A still further object is to provide a vehicle of the type referred to, which is adapted to turn in a relatively small radius to enable the operator to maneuver the vehicle in comparatively close quarters and under all sorts of farm conditions.

A still further object is to provide a vehicle of the type referred to, which is adapted to straddle adjacent crop rows and travel down the field between such rows without damage or injury to the crop.

A still further object is to provide a vehicle of the type referred to, which will operate in a conventional spacing of crop rows, and will travel between said rows without damaging the crop.

A still further object is to provide a vehicle of the type referred to, upon and/or to which many accessories or instrumentalities may be mounted or attached to perform their specific duties, as for example: crop dusters, front end loaders, sickle bar type de-tasselers, tote boxes, endgate seeders, etc.

A still further object is to provide a vehicle of the type referred to, which is particularly and specifically adapted for employment as a carrier of crop spraying equipment.

A still further object is to provide a vehicle of the type referred to, upon which the operator is seated at an elevation sufficiently high and towards the front of the vehicle, so that he may have an unobstructed view of the crop being treated and thereby have an opportunity to effectively and properly observe the operation performed on such crop, particularly when the latter is reaching a state of maturity.

A still further object is to provide a vehicle of the type referred to wherein all vehicle controls are centralized at or adjacent the operator's seat and are readily accessible to the operator when he is seated upon the vehicle, to thus promote easy handling and efficient manipulation of the vehicle and the several appurtenances thereof.

A still further object is to provide a high-clearance type vehicle having a rear-wheel drive, the torque reaction of which transfers weight from the front wheels of the vehicle to the rear wheels thereof.

A still further object is to provide a high-clearance type vehicle, wherein the static weight of same is distributed in such a manner to greatly increase the tractive force exerted by the traction wheels of the vehicle.

These and other objects and advantages of the invention will be apparent from the following description of the accompanying drawings wherein:

Fig. 2 is an enlarged front elevation of the machine shown in Fig. 1, portions of a spray boom being broken away.

Fig. 3 is a fragmentary perspective of the rear portion of the machine with one of the traction wheels removed.

Fig. 4 is a plan view of the mechanism shown in Figs. 1 and 2, portions of the spray boom being broken away.

Figure 1:
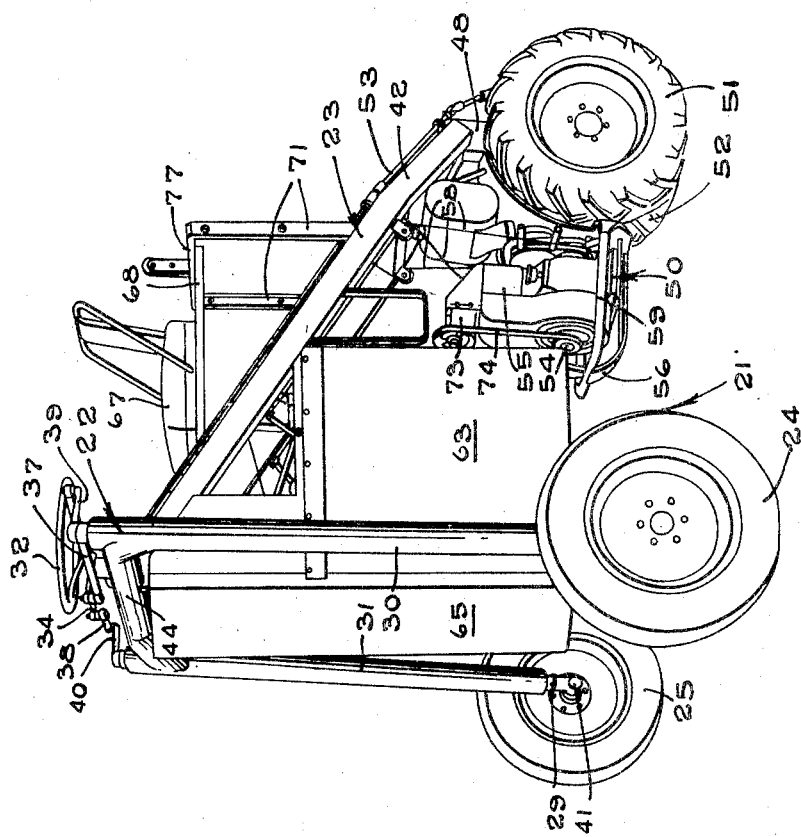
Fig. 1 is a perspective view of a machine embodying the present invention.

Referring first to Figs. 1, 2 and 4 of the drawings, there is illustrated a power driven vehicle 21 including a generally rectangular, high arched front frame portion 22, and a relatively narrow, downwardly and rearwardly sloping central frame portion 23. Dirigible front wheels 24 and 25 of usual automobile type are journaled on wheel spindles 41 welded to extend laterally from the lower ends of steering posts 28 and 29.

The steering posts are rotatively mounted within the generally upright tubular legs 30 and 31 of the front frame portion. The legs 30 and 31 are tilted inwardly and rearwardly at their upper ends to provide caster and tilt necessary for proper steering characteristics in accordance with usual automotive practice.

A steering wheel 32 (Figs. 2 and 4) is secured to a stub shaft journaled in a gear box 33 and is connected by usual reduction gearing, not shown, to a bell crank lever 34. Links 37 and 38 connect the arms of the bell crank lever 34 to lever arms 39 and 40, secured to the upper ends of the steering posts 28 and 29, respectively.

In the illustrated vehicle 21 the tread width of the front wheels is not adjustable. However, a tread width of eighty inches has been found suitable for use among crops planted in rows spaced on forty-two, forty, thirty-eight and thirty-six inch centers. These spacings are considered almost a standard range for most row crops in the United States.

The narrow sloping central frame portion 23 comprises a pair of longitudinally disposed channel members 42 and 43, secured at their forward ends to the top cross bar 44 of the front frame 22 and braced in laterally separated position by a transverse frame member 45 (Fig. 4). The lower, rearward end portions of the longitudinal central frame members 42 and 43 converge and are secured to opposite sides of a vertical frame member 48 which extends upwardly from a narrow transmission case 49 of a power drive unit 50.

This drive unit, in the illustrated embodiment of the invention, comprises a well known type of garden tractor drive mechanism. Other types of wheeled rear end supports can, of course, be substituted for that illustrated, although it is desirable to mount the heavier portions of the machine as low as practicable in order to provide a low center of gravity and thereby increase the stability of the machine.

In the form of rear end support and drive mechanism illustrated, a pair of rubber tired drive wheels 51 and 52 are mounted in closely juxtaposed position on opposite sides of the narrow transmission case 49 (Fig. 4). The transmission case has usual change-gear drive mechanism embodied therein and is adapted to be controlled from the driver's seat by an articulated gear shift rod 53 (Figs. 1 and 4), so that the torque impulse from the drive shaft 54 of an internal combustion engine 55 mounted on the forward end of the transmission case 49, can be transmitted at selected reduced speeds to the drive wheels. Usual throttle, clutch and brake mechanisms also are provided, and are connected by cables 58 (Fig. 1) to usual pedals and levers, not shown, mounted within convenient reach of an operator.

An engine guard structure comprising a tubular frame 59 with a shoe 56 welded to extend lengthwise thereof, is mounted (Figs. 1 and 2) beneath the engine to protect it from obstacles over which the machine may be driven. A towing lug 61 is provided on a rearwardly extending portion 57 of the transmission case 49, so that the entire rear end of the vehicle 21 can be raised up and secured by the towing lug to a co-operating hitch member, not shown, mounted on a truck or tractor for towing the machine along a road or highway. When thus towing the vehicle, the front wheels 24 and 25 (Figs. 2 and 4), then in trailing position, are adapted to be locked in straight fore and aft position by a set screw 62 which is adapted to be screwed through a hole in the bell crank lever 34 into anchoring engagement with a socket provided therefor in the steering gear box 33.

A liquid supply tank 63 (Fig. 1), sufficiently narrow to pass between adjacent rows of high growing food plants, such as corn, is mounted centrally of the machine. The rear end of the spray tank is suspended from the rearwardly sloping central frame members 42 and 43 so that the top of the tank forms a floor for the operator's compartment. The forward end of the spray tank 63 is suspended from the top cross bar 44 of the arched front frame portion 22 by a plate 65. The plate 65 is V-shaped in cross section, with the apex of the V directed forwardly to form a prow which deflects the plants laterally as the machine passes between adjacent rows thereof and prevents them from being bent over and damaged. The upper portion of the tank support plate 65 comprises a shield which protects the legs of the operator when seated on a seat 67.

The seat 67 is mounted for slidable fore-and-aft adjustment on tracks 68 and 69 (Figs. 1 and 4), and is adapted to be secured in adjusted position thereon by a usual locking lever, not shown. The seat tracks 68 and 69 are supported at their forward ends on the transverse bracing member 45, and at their rearward ends on a transverse bracing member 77, secured across the upper ends of a pair of uprights 71, mounted on the longitudinal frame members 42 and 43. The upright seat track support members also serve as alternate mounting supports for two pairs of parallel links which adjustably support a pair of spray boom sections in a manner described in the aforementioned patent.

A hydraulic pump 73 (Fig. 1) for pumping the spraying liquid is mounted on the engine support and is adapted to be driven from the engine by a V-belt 74 passing around pulleys secured to the pump shaft and to the engine drive shaft.

While I have illustrated and described a preferred embodiment of the present invention, it will be understood however that various changes and modifications may be made in the details thereof without departing from the spirit and scope of the appended claims.

Having thus described the invention, what I claim as new and desire to protect by Letters Patent is as follows:

1. A vehicle comprising a relatively high and wide arched end frame, a pair of dirigible support wheels mounted one on the lower end of each leg of said arched frame, a downwardly sloping narrow central frame having the higher end thereof connected to said arched frame, a depending support member downwardly projected from the lower rear end of said central frame, a relatively narrow transmission unit supported by said depending member and positioned below said central frame, a pair of drive support wheels mounted upon opposite sides of said transmission unit, and an engine supported by said depending member below said central frame and connected to the forward end of said transmission unit to have driving engagement with said drive support wheels through said transmission unit.

2. A vehicle comprising a relatively high and wide arched frame at the forward end thereof, said arched frame having its depending legs sloping outwardly and forwardly to provide a camber requisite for proper steering characteristics, dirigible support wheels mounted upon the lower divergent ends of said legs, a relatively narrow downwardly and rearwardly sloping central frame connected at its forward higher end intermediately of said arched frame, a pair of traction support wheels rotatably mounted in relatively close spaced relation upon the lower rear end of said central frame, steering means mounted upon said arched frame and operatively connected to said dirigible support wheels to control the same for steering said vehicle, vehicle propulsion means mounted upon said central frame and having driving connection with said traction support wheels, and a tank supported by said arched frame and inwardly disposed from the outwardly depending legs of said arched frame so as to define two parallel passages for the accommodation of adjacent crop rows.

3. A vehicle comprising a relatively high and wide arched frame at the forward end thereof, dirigible support wheels mounted upon the legs of said arched frame, a relatively narrow downwardly and rearwardly sloping central frame including longitudinally disposed, spaced parallel frame members and a rearwardly disposed and substantially vertical frame member, said spaced parallel frame members having their lower rear end portions bent in convergent relation and rigidly secured to said vertical frame member, a relatively narrow transmission unit mounted for suspension from said vertical frame member for positioning below said central frame, a pair of traction support wheels mounted upon opposite sides of said transmission unit, and an engine supported by said vertical member below said central frame and cooperatively associated with the forward end of said transmission unit to have driving connection with said traction support wheels through said transmission unit.

4. A vehicle comprising a frame having a relatively high and wide arched portion at the forward end thereof, dirigible support wheels mounted upon the depending legs of said forward end frame portion, traction wheel means operably mounted adjacent the rear of said frame, a depending support member downwardly projected from the rear end of said frame, a propulsion engine supported by said depending member below the frame rearwardly of the longitudinal center of the vehicle and slightly forwardly of said traction wheel means whereby to concentrate weight over said traction wheel means on uphill grades, and an operator's seat mounted on said frame adjacent the upper forward portion of said frame.

5. A vehicle for use in cultivating row crops comprising a frame support structure having an inverted U-shaped forward end member disposed transversely of the path of forward movement of the vehicle and an engine support member downwardly projected from said frame support member structure and extending rearwardly in a vertical longitudinal plane through substantially the middle of said forward end member, the depending legs of said U-shaped forward end member being spaced transversely on each side of the plane of said engine support member a distance sufficient to define two parallel passages to accommodate the passage of adjacent crop rows therethrough, a drive wheel operably mounted at the rear of said engine support member between said passages, a dirigible wheel operably mounted on each leg of said forward end member, and an engine supported by said engine support member rearwardly of the longitudinal center of the vehicle and below said frame structure.

6. A vehicle comprising a relatively high and wide arched frame at the forward end thereof, dirigible support wheels mounted upon the depending legs of said arched frame, a relatively narrow downwardly and rearwardly sloping central frame connected at its forward end to said arched frame and centrally positioned thereon and disposed inwardly of the extremities of the laterally extending member of said arched frame, a pair of rotatable traction support wheels disposed adjacent the lower rear end of said central frame in relatively close spaced relation, a depending support member downwardly projected from the lower rear end of said central frame, vehicle propulsion means supported by said depending member below said central frame, means mounting said traction wheels in supporting relation to said depending member and in supporting relation with said propulsion means, means providing a driving connection between said propulsion means and said traction wheels, a vehicle operator's seat mounted upon the forward portion of said central frame, and means disposed conveniently to the operator on said seat for controlling the steering and propulsion of said vehicle.

7. A vehicle comprising a high arched frame at one end thereof, dirigible support wheels mounted upon the legs of said arched frame, a relatively narrow downwardly sloping central frame connected at its upper end to said arched frame, a pair of rotatable traction support wheels disposed adjacent the lower end of said central frame, a depending support member downwardly projected from the lower end of said central frame, vehicle propulsion means supported by said depending member below said central frame, means mounting said traction wheels in supporting relation to said depending member and in supporting relation with said propulsion means, means providing a driving connection between said propulsion means and said traction wheels, a vehicle operator's seat mounted upon said central frame, and a relatively narrow fluid storage tank jointly carried by said arched frame and said central frame, said tank positioned adjacent and below said operator's seat and with the top wall thereof arranged to form a foot rest for the vehicle operator and disposed inwardly of the legs of said arched frame to provide a spaced relationship with the legs of the arched frame to accommodate the passage of crops.

8. A vehicle comprising a relatively high and wide arched frame at the forward end thereof, dirigible support wheels mounted upon the legs of said arched frame, a relatively narrow downwardly and rearwardly sloping central frame connected at its forward higher end to said arched frame, said central frame including longitudinally disposed spaced parallel frame members having their lower rear end portions bent inwardly to form a convergent lower rear terminal portion on said central frame, a pair of rotatable traction support wheels disposed adjacent opposite sides of said lower rear terminal portion, a depending support member downwardly projecting from the lower rear end of said central frame, an engine supported by said depending member below said central frame, and means mounting said traction wheels in supporting relation with said depending member and in driven association with said engine.

9. A vehicle of the high-clearance type comprising an inverted U-shaped frame at the forward end thereof, a pair of dirigible support wheels mounted on said U-shaped frame in relatively wide spaced relation, a downwardly and rearwardly sloping central frame consisting of at least one longitudinally disposed member connected at its forward higher end to said U-shaped frame substantially at mid-point thereon, a pair of rotatable traction support wheels disposed in relatively close spaced relation adjacent the lower rear end of said central frame, a depending support member downwardly projected from the lower rear end of said central frame, an engine supported by said depending member below said central frame adjacent the rear end thereof, and means mounting said traction wheels in supporting relation to said depending member and in driven association with said engine.

10. A vehicle comprising a relatively high and wide arched frame at the forward end thereof, dirigible support wheels mounted upon the legs of said arched frame, a relatively narrow downwardly and rearwardly sloping central frame connected at its forward higher end to said arched frame substantially at midpoint thereon, a support member depending from the rear end of said central frame, a pair of traction support wheels mounted in relatively close spaced relation at the lower end of said support member, a relatively narrow V-shaped plate rigidly secured at its upper end to and depending from a mid portion of the base of said arched frame with the apex lying in a vertical plane and directed forwardly to form a deflecting prow on said vehicle, said V-shaped plate disposed inwardly of the edges of said arched frame for providing a spaced relationship with the legs thereof to accommodate the passage of crops, and vehicle propulsion means mounted upon said support member directly behind said prow and having driving connection with said traction support wheels.

11. A vehicle comprising a high arched frame at one end thereof, dirigible support wheels mounted upon the legs of said arched frame, a relatively narrow downwardly sloping central frame connected at its higher end to said arched frame, a pair of traction support wheels mounted upon the lower end of said central frame, a depending support member downwardly projected from the lower rear end of said central frame, vehicle propulsion means supported by said depending member below said central frame and having driving connection with said traction support wheels, and a vehicle operator seat mounted upon said central frame and disposed at substantially the same horizontal plane as the uppermost portion of the arched frame when the vehicle is traveling on a level surface.

12. A vehicle comprising a frame having a forward end member of U-shape disposed transversely to the path of forward movement of the vehicle and an engine support member downwardly projected from said frame and extending rearwardly in a vertical longitudinal plane through substantially the middle of said U-shaped forward end member, support wheels operably attached to said frame, said support wheels comprising a dirigible wheel attached to each leg of said U-shaped member and a traction wheel rotatably mounted on said support member, an engine mounted on said support member rearwardly of the longitudinal center of said vehicle and positioned below said frame, and means providing a driving connection between said engine and said traction wheel.

References Cited in the file of this patent

UNITED STATES PATENTS

| | | |
|---|---|---|
| 1,089,145 | McDonald | Mar. 3, 1914 |
| 1,169,402 | Holt | Jan. 25, 1916 |
| 1,176,388 | Mann | Mar. 21, 1916 |
| 1,176,464 | King et al. | Mar. 21, 1916 |
| 1,650,651 | Preston | Nov. 29, 1927 |
| 2,066,666 | Becker | Jan. 5, 1937 |
| 2,451,553 | Hedquist et al. | Oct. 19, 1948 |
| 2,504,403 | Finley | Apr. 18, 1950 |
| 2,508,605 | Hagie et al. | May 23, 1950 |
| 2,530,941 | Devirian | Nov. 21, 1950 |
| 2,619,361 | Connors et al. | Nov. 25, 1952 |
| 2,647,795 | Kucera | Aug. 4, 1953 |
| 2,653,436 | Warner | Sept. 29, 1953 |

FOREIGN PATENTS

| | | |
|---|---|---|
| 399,791 | France | May 3, 1909 |
| 734,174 | France | July 25, 1932 |